United States Patent [19]

Nelson, Jr.

[11] 3,924,840
[45] Dec. 9, 1975

[54] VISCOSITY CONTROL FOR A PLASTIC MOLDING MACHINE
[75] Inventor: Philip H. Nelson, Jr., Roanoke, Va.
[73] Assignee: General Electric Company, Salem, Va.
[22] Filed: Sept. 18, 1972
[21] Appl. No.: 289,783

[52] U.S. Cl............................ 259/191; 324/140 D
[51] Int. Cl.² ........................................... B29B 1/10
[58] Field of Search ......... 259/191, 192, 193, 9, 10, 259/25, 26, 45, 46; 425/143, 144, 145; 264/40; 324/142, 140 D, 141

[56] References Cited
UNITED STATES PATENTS

| | | | |
|---|---|---|---|
| 3,447,201 | 6/1969 | Seanor............................ | 259/191 |
| 3,492,700 | 2/1970 | Kornmayer..................... | 425/145 |
| 3,693,946 | 9/1972 | Merritt............................ | 259/191 |
| 3,733,059 | 5/1973 | Pettit............................... | 259/191 |

*Primary Examiner*—Robert W. Jenkins
*Attorney, Agent, or Firm*—W. C. Bernkopf; J. H. Beusse

[57] ABSTRACT

A control for a plastic molding machine of the type employing a moving screw, disposed within a barrel, operative to act upon plastic material in a solid state to impart to that material energy which is substantial in providing the total amount of heat required to convert (plasticize) the solid material to liquid form to provide what is known as "melt". The control includes means for sensing velocity and pressure factors with respect to the melt, and by properly relating the velocity and pressure factors, the control provides a viscosity measurement which is utilized to control various machine operating parameters.

20 Claims, 3 Drawing Figures

VISCOSITY CONTROL FOR A PLASTIC MOLDING MACHINE

BACKGROUND OF THE INVENTION

The present invention relates generally to controls for plastic molding machines and more particularly to controls for plastic injection molding machines which control automatically adjusts the operating parameters of the machine based upon the viscosity of the molten plastic material. Historically, plastic molding machines, particularly those of the injection type, were controlled by manual adjustment. During the initial setup the operator, relying upon his prior experience, made initial setup adjustments and by observing subsequent operations continued to make adjustments to several operating parameters of the machine to produce the molded parts. As such it is readily seen that the initial setup and constant attention to the product produced required not only a large amount of time but that the quality of the parts was highly dependent upon the skill of the individual machine operator. With the increasing use of plastics and the ever increasing types of plastics utilized as well as the proliferation in the types of machines it has become increasingly difficult as well as expensive to obtain skilled operators for plastic molding machines.

More recently it has become the practice to select a particular variable and to control the machine in accordance with fluctuations in that variable. One such known method in an effort to make the machine less dependent upon a human operaor is found in co-pending application Ser. No. 194,233, "Plastic Melt Temperature Control", filed Nov. 1, 1971, by James E. Wheeler assigned to the assignee of the present invention. In this co-pending application, the operator parameter controlled was that of temperature and several operating parameters of the system were varied to effect what experience had shown to be a proper temperature for the production of parts. Another known system in the art for the increased automation of plastic injection molding machines was to measure the pressure within the mold cavity or immediately adjacent thereto and to utilize this measurement as a means for varying injection pressure to thereby effect or control the peak pressure within the cavity mold. This concept is set forth in more detail in the article entitled "Pressure losses in the injection mold" by Donald C. Paulson from the October, 1967 issue of *Modern Plastics* and a paper by Donald C. Paulson and Wesley M. Viilo entitled "Plastic Pressure Recording Analysis of Injection Molding Machine Pressure Variables" presented at the 26th Annual Technical Conference of the Society of Plastics Engineers held May 6–10, 1968. Both of these systems, while representing advancements in the art of automation of plastic molding machines, also have certain deficiencies in that both recognize an operating parameter which is one of a multiplicity of variables which affect part quality.

However, in each of the known prior art systems the lack of compensation for the totality of the variables of the material as well as the machine is lacking. In this respect it should be noted that the material itself is subject to a wide variation in that different types of plastic may be used in the same machine. Even assuming that the same type of plastic is used, variations in molecular weight, contaminants, moisture content and pellet size are all factors which will cause a material to react differently. Additionally, there are a number of variable factors with respect to the same machine which will cause that machine to react differently at different times. As an example, in a hydraulically operated machine, the oil temperature and cleanliness will affect the machine operation.

It is, therefore, an object of the present invention to provide an improved control for a plastic molding machine.

It is a further object to provide an improved control for a plastic injection molding machine which control monitors that variable most nearly approximating the several variables within the system.

It is an additional object to provide a control for a plastic injection molding machine which provides a measure of melt viscosity to control the machine.

It is a still further object of the present invention to provide a plastic injection molding machine control which senses a pressure and velocity factor of the machine to derive the viscosity of the material and to utilize this measurement to control operating parameters of the machine to effect the overall control thereof.

SUMMARY OF THE INVENTION

Briefly stated, the present invention provides a control for a plastic molding machine in which there is generated an error correction signal upon each operation of the machine which signal is utilized to adjust the machine during either that or during subsequent operations. The control essentially provides for measuring the viscosity of the plastic melt by sensing two factors which relate to viscosity as established by Poiseuille's equation, which in simplified form for a given mechanical configuration states that viscosity is proportional to the ratio of pressure divided by velocity. Thus, by measuring velocity and pressure within the system, which measurements may be done directly, the viscosity, which reflects the basic variables of both material and machine, may be calculated and this calculated viscosity utilized to control the operating parameters. In the embodiment of the invention here described there is employed a screw type machine having a heated barrel. The derived viscosity measurement is used to control the screw injection velocity, the back pressure maintained upon the reciprocal screw, and the amount of heat supplied to the barrel. Each of these parameters determine the amount of heat imparted to the molten plastic, it being understood that this amount of heat is a primary factor in controlling viscosity.

DESCRIPTION OF THE DRAWINGS

Further objects and advantages of the present invention will become apparent as the following description proceeds and the features of novelty which characterize the invention will be pointed in particularity in the claims next to and forming a part of this specification. For a better understanding of the present invention reference is made to the accompanying drawings in which:

DETAILED DESCRIPTION

Figure 1:
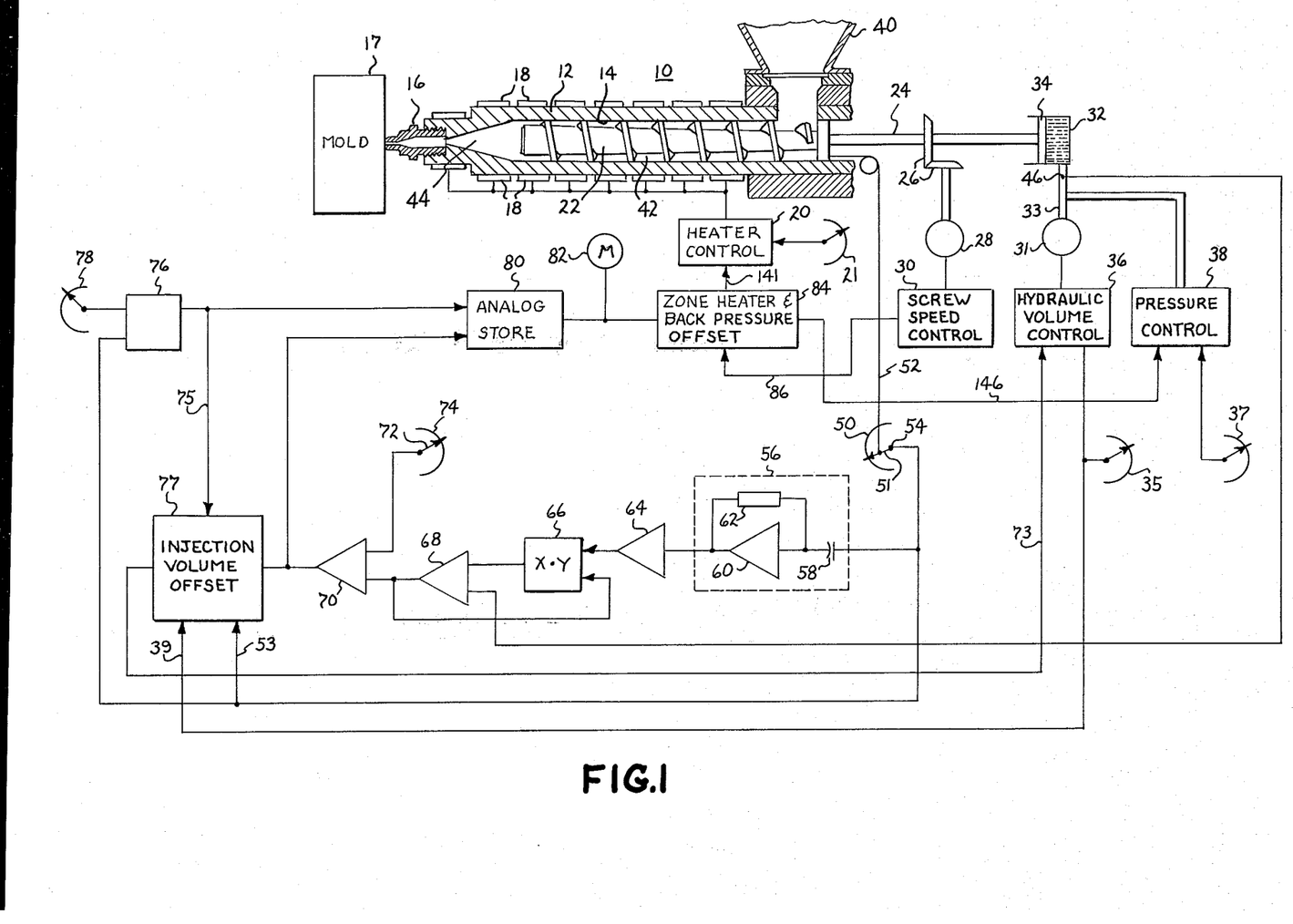
FIG. 1 is a schematic view of a typical plastic injection molding machine in an operational relationship with the control of the present invention, a portion of which is shown in block form.

Referring now to FIG. 1 there is shown an injection molding machine indicated generally at 10 which includes a barrel 12 having a centrally extending bore 14. A nozzle 16 containing a suitable valve mechanism (not shown) is located at one end of the barrel 12. The barrel 12 is surrounded by a plurality of heating elements 18 which are operationally under the control of a suitable heater control 20. The heaters 18 are normally of the electrical resistance type and are primarily for the purpose of maintaining the barrel 12 at a constant temperature to help assure the proper operation of the machine but are also used, as will be hereinafter explained, to assist at the appropriate time in maintaining the appropriate or proper viscosity of the material within the barrel. The heaters 18 are connected to a suitable power source (not shown) through the heater control 20 and the amount of power supplied to the heaters 18 is governed by the heater control 20. Disposed within the bore 14 of the barrel 12 is a rotating screw 22 which is connected via suitable means such as a shaft 24 and gearing 26 to a motor 28 whereby the screw may be rotated about its longitudinal axis. The motor 28 is energized from a suitable power source (not shown) by way of a screw speed control means 30, all in a manner well known in the art. (It is, of course, to be realized the actual method of giving rotary motion to the screw 18 is shown here in the simplified form for explanatory purposes.)

As well as rotational motion, the screw 22 is designed for linear motion along its longitudinal axis. The means by which this motion is achieved, is for purposes of illustration, shown as a simple hydraulic system including a cylinder 32 within which is disposed a piston 34. The volume of fluid delivered to the cylinder 32 is the function of a pump 31 under the control of a suitable hydraulic volume control 36. The pressure of the fluid within the system is controlled by a pressure control 38. The pressure control 38 serves to govern the pressure within the hydraulic system and may be any suitable means but most commonly is the form of a relief or bypass valve.

A hopper 40 is disposed at the right hand or rear portion of the machine 10 for the introduction of plastic material, usually in the form of pellets, into the barrel. From the hopper end of the machine, the plastic is fed to the forward end of the barrel by the auger action of the rotating screw. As is customary in the art the design of the screw 22 is such that it includes a spiral flute 42 the depth of which decreases from the hopper end of the screw toward the front or nozzle end. In operation it is this construction which provides the primary source of the heat for converting or plasticizing the plastic material from the solid (pellet) form into a liquid form or as is more commonly known in the art to provide the "melt". The rotational action of the screw as it feeds plastic material toward the nozzle end of the machine creates shearing and compression forces within the plastic material itself which causes the plastic material to become sufficiently heated to melt. As was previously explained the heaters 18 also serve to provide heat in aiding the melting of the material and as will be further realized and described hereinafter the amount of pressure maintained by the hydraulic system on the screw represents additional work input to the material which affects its melting.

To the left of the screw as shown in FIG. 1 there is a region 44 which is known as the shot volume region. In FIG. 1 the screw is shown in its most forward position. Under the rotational action of the screw plastic is fed into the region 44. As more and more material is forced into this region the increasing resulting pressure on the face of the screw tends to force the screw back (to the right as illustrated in FIG. 1). This action is opposed by the hydraulic system of the machine which is under the control of the pressure control 38. When the screw reaches a prescribed position and a shot is formed in front of the screw the rotational action of the screw is halted. This shot is then forced through the nozzle 16 into a mold 17 under the action of the hydraulic system, primarily the hydraulic volume control 36 which acts upon piston 34 to impart linear motion to the screw along its longitudinal axis. In this portion of the machine cycle the screw acts as a ram or piston.

Before beginning a detailed description of the control portion of FIG. 1 an explanation of presentation is believed desirable. All paths shown are signal paths to transmit either an analog or digital signal in accordance with the description that follows. In addition, it is noted that several potentiometers are illustrated and that while no power connections are shown connected to these potentiometers they are to be considered as connected to a suitable source of power all in a manner well known in the art. And, while potentiometers are shown, it is to be realized that these devices designed to provide signals of varying magnitude or quantity in accordance with their instantaneous settings, and as such they are to be considered as representative of suitable devices capable of such similar functions. For convenience, signals may be termed as either positive or negative signals with the expressed understanding that this is an arbitrary designation and that relative polarities could be reversed, the signals could be of a different specified values with respect to an arbitrary zero or the system could be implemented using digital and/or analog signals.

Referring once again to FIG. 1, the control circuit includes a postion potentiometer 50 having a wiper 51 which is connected by a suitable mechanical means illustrated as a cable 52 to the screw 22 such that the position of the potentiometer is changed in accordance with the longitudinal position of the screw. As such there is provided at the wiper terminal 54 a signal the magnitude of which is proportional to the position of the screw 22 within the bore of the barrel 12. The position signal from terminal 54 forms an input to a differentiating network shown within the dotted box 56. The differentiating network comprises a capacitor 58 in series with an amplifier 60 which has a resistor 62 connected in parallel therewith. The output of the amplifier 60 represents the velocity of the screw movement. That is, the output of the amplifier 60 is proportional to the velocity or the first derivative of position; i.e., equal to $d/dt$. The output of amplifier 60 is developed to a suitable level by an additional amplifier 64 the output of which forms one input to a standard X·Y analog multiplier 66. The second input to multiplier 66 is the output of a two input operational amplifier 68. The first input to the amplifier 68 is the output of multiplier 66 while the second input is a signal derived from a pressure sensor 46 located within the hydraulic system intermediate pump 31 and the cylinder 32 to provide a signal the magnitude of which is proportional to the pressure.

The arrangement of an operational amplifier and a multiplier in which the multiplier is in a feedback path of the operational amplifier as is shown in FIG. 1 is known to provide an output which is proportional to the quotient of the two inputs. Thus, in the present instance where the two inputs are pressure and velocity, the output by Poiseuille—s equation is proportional to viscosity (Viscosity ≈ Pressure/Velocity). There exists, therefore, at the output of the amplifier 68 a signal which is indicative of the viscosity of the plastic within the barrel of the machine 10.

The placement of the pressure sensor in the position indicated assumes the noncompressibility of liquids by assuming that the pressure within the hydraulic system of the pump will be identical to the pressure of the molten plastic material within the region 44 of the barrel 12. In actuality this is known to be a false assumption in that while the pump hydraulic system (normally oil) is substantially incompressible the same does not necessarily hold true for plastic material which tends to be slightly compressible. In addition, there exists a certain amount of pressure losses within the mechanical system due primarilly to friction. However, for the majority of applications the total system pressure is sufficiently uniform to provide accurate measurements. It is to be realized that in the event a more accurate measurement is required the pressure sensor could be located within the region 44 to provide a direct measurement of the actual pressure of the plastic melt. The placement of the pressure transducer within the region 44 would tend to reduce the life of the transducer and/or necessitate a more expensive transducer in that the molten plastic in that region represents a hostile environment.

The output of the operational amplifier 68 which respresents the instantaneous viscosity of the molten plastic material within the machine 10 forms one input to an analog comparator 70 the other input of which is derived from wiper 72 of a potentiometer 74. Potentiometer 74 provides a signal known as the viscosity index. This signal is a reference signal which is manually ajusted according to normal setup procedures and represents that viscosity level which experience has indicated to the operator provides a quality part. Thus, there is provided at the comparator 70 a signal which represents the instantaneous deviation of viscosity from that which is deemed to be the prescribed or desired level. This instantaneous deviation or viscosity error signal forms an input to an injection volume offset circuit 77 and also provides one input to an analog store circuit 80.

The injection volume offset 77, the details which will be explained with respect to FIG. 2, accepts the viscosity error signal, along with signals from potentiometer 50 via line 53 and a comparator 76 via line 75, and after assuring that the machine is within prescribed limits which will allow a correction to be made provides an output signal on a line 73 to the hydraulic volume control 36 which signal serves to control the hydraulic volume control to vary the volume of the input to cylinder 32 which will in turn either speed up or slow down the rate of change or the velocity at which the screw 22 is moving while it is in the process of performing its ramming action to inject the molten plastic into the mold 17.

The output of potentiometer 50, which it will be remembered provides a signal proportional to the position of the screw 22 within the barrel 12, serves as an input to digital comparator 76. The second input to the comparator 76 is the output of a potentiometer 78 which is manually adjustable and which is adjusted to provide a voltage to the comparator 76 which is proportional to a prescribed position of the screw 22 within the barrel 20. The screw position represented by the setting of potentiometer 78 is one of the more forward positions of the screw and corresponds to the most forward position of the screw beyond which the viscosity is not readily changed by varying screw velocity and after which other parameters are more appropriately varied to control viscosity. Thus, when the output from terminal 54 of potentiometer 50 is a signal the magnitude of which is the same as or greater than the output of potentiometer 78, indicating that the screw has reached or exceeded this forward position, comparator 76 provides an output signal which is supplied as the second input to the analog store circuit 80. The same signal forms an input via line 75 to the injection volume offset 77 for purposes as will be described.

When the comparator 76 provides an output signal indicating that the screw has reached a prescribed position, the error signal from comparator 70 is gated into the analog store 80 which analog store then provides for retention of the viscosity error signal. If desired a meter 82 may be connected to the output of the analog store for a visual indication of the magnitude of its output.

The output of the analog store 80 is in turn provided to a zone heater and back pressure offset circuit 84 the details of which will be discussed with respect to FIG. 3 and the output of this latter circuit forms an input to the heater control 20 to control the amount of heat provided by the heaters 18. Circuit 84 provides a further output which forms a control signal to the pressure control 38 to effect the operation of that device. It is to be realized that the heater control 20, hydraulic volume control 36 and pressure control 38 are all variable controls and that each will have, in addition to the inputs of the present system, a means for initially adjusting its setting to provide an initial operational set up. These means are illustrated in FIG. 1 as potentiometers 21, 35 and 37 forming inputs to the controls 20, 36, and 38 respectively. Potentiometer 35 also provides an input to the injection volume offset 77 via line 39. The final showing of FIG. 1 is a line 86 which serves to transmit a signal indicative of screw rotation initiation from the screw speed control 30 to the circuit 84.

Figure 2:
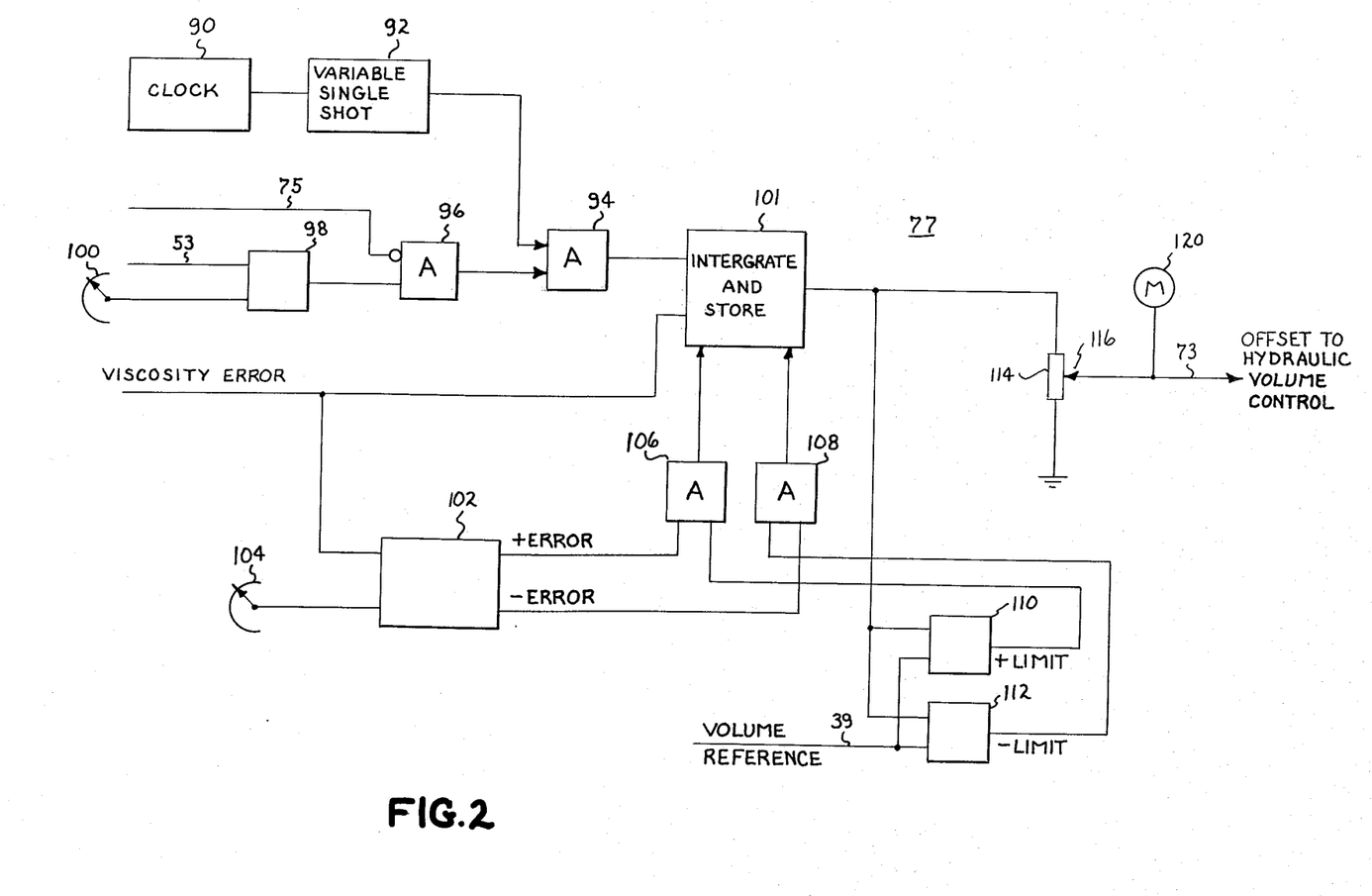
FIGS. 2 and 3 are schematic drawings showing in greater detail portions of the control shown in FIG. 1 in block form.

The details of the injection volume offset 77 and the manner in which it functions to vary the hydraulic volume control 36 to in turn control the velocity factor of viscosity measurement within the prescribed limits of machine operation may be seen with respect to FIG. 2. As there is shown, the injection volume offset 77 includes a clock generator 90, which may be a free running multivibrator to provide a series of pulses to a variable single-shot 92. The variable single-shot 92 may be of the type well known in the art consisting of a monostable multivibrator which is adjustable to provide a variable length output signal in response to each input signal. The output of the single-shot 92 forms one input to an AND-gate 94 and serves to enable that AND-gate for a prescribed length of time for each clock pulse. The second input to AND-gate 94 is the output of an AND-gate 96 the first input of which is the inversion of the signal on line 75 from the comparator 76 (FIG. 1). The second input to AND-gate 96 is the output of a digital comparator 98 having a first input from a potentiometer 100 which is manually adjustable to provide an output voltage which represents the most rearward position of the screw 22 at which a velocity correction may be made. The other input to comparator 98 is the position signal derived from the potentiometer 50 (line 53) such that the comparator 98 supplies a digital output signal whenever the screw is at or exceeds a position corresponding to the most rearward position of forward movement of that screw during which correction may be taken. The output of AND-gate 96, therefore, is positive during that period of time when the screw is between two prescribed linear positions within the barrel.

The output of gate 94, when positive, serves as a gate signal to an integrate and store network 101 which will enable that circuit during prescribed portions of the operational cycle of the injection molding machine.

Also forming an input to the integrate and store 101 is the viscosity error signal from the comparator 70 which signal is also an input to a comparator circuit 102 the second input of which is from an adjustable potentiometer 104. The potentiometer 104 may be set at a prescribed level in accordance with the system design such that the output of comparator 102 is two signals, one (Error +) indicating that the viscosity error is positive with respect to the reference from the signal from potentiometer 104 and the second (Error −) output indicating that the error is negative with respect to that reference. By appropriate system design the potentiometer 104 may be eliminated and the viscosity error compared to some readily established value, for example, ground. However, in the general sense this is an arbitrary selection and the reference is, therefore, represented as a potentiometer 104. The positive and negative error signals from the comparator 102 are applied respectively as inputs to each of two AND-gates 106 and 108. The second inputs to each of these AND-gates 106 and 108 are the outputs of two comparator circuits 110 and 112. Comparators 110 and 112 each receive an input from the output of the integrate and store circuit 101. A second input to each of the comparators 110 and 112 is called a volume reference and this reference is a signal which comes from the hydraulic volume control via line 39 and is the volume reference of the setting of the hydraulic volume control illustrated by potentiometer 35. Comparator 110 is designated as the positive limit and comparator 112 the negative limit. Thus, there is provided at the output of these two comparators signals which are indicative of the positive and negative offset amounts from the volume reference through which the pump volume control circuit may operate and these two outputs are applied respectively as inputs to the two AND-gate 106 and 108.

Each of the AND-gate 106 and 108 when enabled provides an output to the integrate and store 101 which serves to inhibit that circuit.

The operation of the injection volume offset circuit 77 which is illustrated in detail in FIG. 2 is then as follows. With the appearance of a viscosity error signal from the output of the comparator 70 (FIG. 1) there is applied to the integrate and store 101 an analog signal of a magnitude corresponding to the amount of the viscosity error. Assuming that the screw is positioned between the two prescribed points in the injection cycle, AND-gate 96 will be enabled such that upon the appearance of a positive output from the variable single shot 92 AND-gate 94 is enabled to thus enable the integrate and store circuit 101 and permit it to integrate and store the analog viscosity error if the integrate and store circuit 101 is not disabled by an output from either of the AND-gates 106 or 108. AND-gate 106 will provide a positive output in the event that the viscosity error as applied to the comparator 102 is positive with respect to the reference from the potentiometer 104 and the integrate and store output is of a magnitude sufficient to provide the limit signal from the comparator 110. In a similar manner if the viscosity error is negative as indicated by the output from the comparator 102 and the value of the integrate and store circuit is negative beyond the prescribed amount such that there is provided an output from the comparator 112, AND-gate 108 will be enabled to disable the integrate and store circuit 101. This system in essence places a limit upon the value to which the integrate and store circuit 101 may go and hence represents both a positive and negative limit with respect to a setpoint which may be provided as an offset control signal to the pump volume control 36 via line 73. (It is of course to be realized that even though the positive limit has been reached as indicated by an output from the comparator 110 if the error goes from positive to negative with respect to the reference supplied no inhibiting will be effected upon the integrate and store circuit 101. Likewise if a negative limit has been reached and the error has gone from negative to positive no limit will be effected.) Thus, there is provided an output from the integrate and store which is supplied to a scaling resistor 114 a signal which has both a magnitude and a relative direction. This signal which amounts to a voltage across the resistor 114 is tapped by means of a sliding contact 116 and applied via line 73 as an offset signal to the hydraulic volume control. This signal serves to vary the rate of the hydraulic volume control 36 in proportion and direction to the signal appearing on this line to effect a change in the hydraulic volume control and hence a change in the hydraulic volume output. With a change in hydraulic volume output there is effected a change in the velocity of the screw as it moves forward in its ramming action. Also as is shown in FIG. 2 if a visual indication of the signal is desired a meter 120 may be connected to the line 73.

Figure 3:
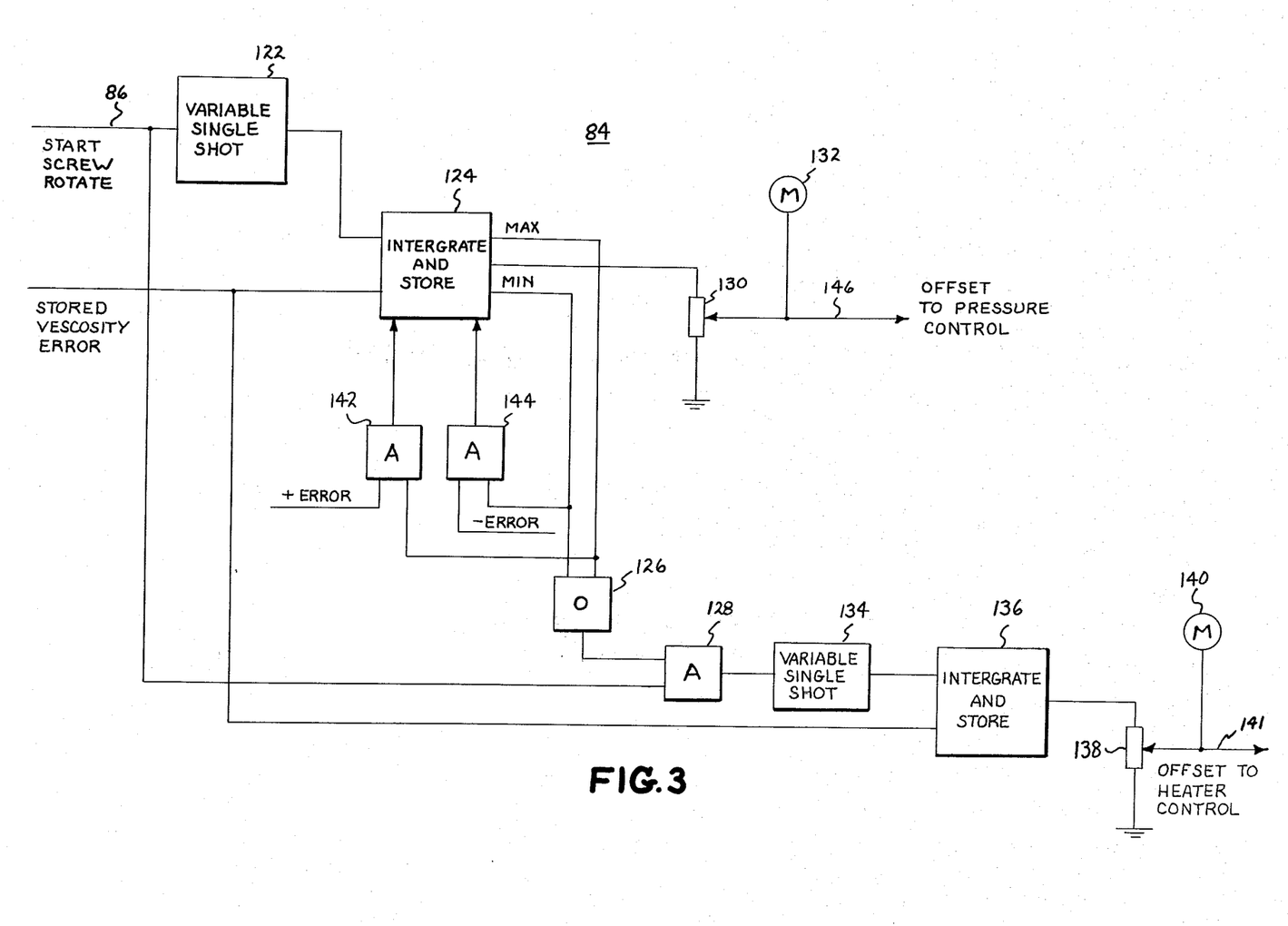

The details of the zone heater and back pressure offset 84 are shown in FIG. 3. Referencing now FIG. 3, a variable single-shot 122 has applied thereto an input signal "start screw rotate". This signal is derived from the screw speed control by a suitable means associated with the sequencing of the machine and indicates that the rotational action of the screw 22 has begun. The output of the single-shot 122 forms a gating input to an integrate and store circuit 124. A second input to the integrate and store circuit 124 is the stored viscosity error signal from the analog store 80 (FIG. 1). Thus, the stored viscosity error signal appearing on input line to the circuit 124 will be integrated over a period determined by the length of the output pulse from the variable single-shot 122. Three outputs are provided from the integrate and store circuit 124. Two of these outputs are labeled respectively "MAX" and "MIN" and represent designed limit values for a maximum and minimum value of the integrate and store circuit over which integration should take place. These two signals form inputs to an OR-gate 126 and respectively also input to two AND-gates 142 and 144. The second inputs to gates 142 and 144 are the signals Error + and Error − which have been stored by suitable means not shown from the comparator 102 (FIG. 2) of the injection volume offset 77. Thus, similarly to that described with respect to the integrate and store 101 of FIG. 2, if the integrate and store 124 has reached a maximum limit and the viscosity error signal is positive, the output of AND-gate 142 will inhibit the circuit 124. If the integrate and store 124 has reached a minimum limit and the viscosity error signal is negative, the output of AND-gate 144 will inhibit the circuit 124.

In operation, so long as the integrate and store circuit 124 is within the bounds defined by the "MAX" and "MIN" signals, the circuit will continue to integrate the stored viscosity error signal for the length of the pulse from the single shot 122. The output of the circuit 124 is applied to a resistor 130 which has a sliding tap for providing an output to the pressure control 38 (FIG. 1) via line 146. The resistor 124 with its sliding tap is for the purposes of providing a range control and scaling of the signal to a value suitable for use within the pressure control 38. If desired, there is also provide a meter 132 to provide a visual indication of the magnitude of the pressure control signal. This signal applied to the pressure control serves during machine cycle following the one during which the viscosity measurement was taken to regulate the pressure within the pump hydraulic system to thus oppose the screw rotation with a greater or lesser amount of pressure to affect the amount of mechanical heat imparted to the material, it being recognized that the temperature of the molten material is a primary factor in determining its viscosity. The amount of this variation or offset is, of course, dependent upon the magnitude of signal applied to line 146

As is normal in most systems there is a practical limit beyond which the several elements may not be changed in order to affect the control within the system. There exists, therefore, the additional showing in FIG. 3 of means for adjusting the heater control 20 to thus aid in changing the viscosity by altering the amount of heat imparted to the molten material by the barrel heaters. As previously stated the MAX and MIN outputs from the integrate and store 124 form inputs to OR-gate 126. The output of this gate serves as one input to a two input AND-gate 128. The second input to AND-gate 128 is the "start screw rotate signal" previously described. Thus, if the integrate and store circuit has reached one of its limits, upon the occurrence of the start screw rotate signal AND-gate 128 will be enabled to, in turn, enable a variable single-shot 134 which provides a pulse of predescribed variation to an integrate and store circuit 136 thus enabling that circuit. A second input to the integrate and store circuit 136 is the stored viscosity error signal from the analog store 80 (FIG. 1). Thus this signal is integrated within the circuit 136 to a value depending upon the length of the time the output of the single-shot 134. The integrated signal then is stored and is maintained as a signal which is applied in a manner similar to that previously described to a potentiometer 138 having a sliding contact. The output of potentiometer 138 is an input signal via line 141 to the heater control 20 which, in accordance with its magnitude and polarity serves to offset the initial control setting to thus raise or lower the temperature of the heaters 18 around the barrel 12. Again, a meter 140 may be provided to provide a visual indication of the magnitude of the signal if desired.

Thus, it is seen that there has been provided a control for a plastic molding machine which employs measured pressure and velocity to calculate a viscosity value for the material being acted upon. This viscosity value is utilized to control prescribed machine operating parameters which, in turn, serve to vary the amount of heat supplied to the plastic material to effect the appropriate changes in its viscosity.

While there has been shown what is at present considered to be the preferred embodiment of the invention, modifications thereto will readily occur to those skilled in the art. For example, in the embodiment described the hydraulic volume control is continuously varied during a prescribed period of operation in which the screw is serving as a ram while the pressure control and heater control are adjusted for the next machine cycle. Modifications to this particular sequence are readily achievable with the appropriate adjustments being selectively made continuously during the cycle, at a given time within the cycle, or at the end of a cycle so that the adjustment affect is upon only subsequent cycles. It is also recognized that other operational parameters may be changed in response to the viscosity determination. An example of the control of one such variable which has not been illustrated in the embodiment shown and described is to vary the rotational speed of the screw in accordance with the viscosity determination to vary the effective amount of energy applied to the material in this portion of the machine cycle. Additionally, while the principles of this invention are shown applied to an injection machine, they have equal applicability to other types of apparatus such as extrusion machines where once again there exists a velocity and pressure associated with the molten material which may be utilized to provide a viscosity measurement which in turn can serve to provide operational control.

It is not desired, therefore, that the invention be limited to the specific embodiment shown and described and it is intended to cover in the appended claims all such modifications as fall within the true spirit and scope of the invention.

What is claimed is:

1. A control for a plastic molding machine of the type in which plastic material is rendered molten through the application of energy by variable means associated with the machine, said control comprising:
   a. means to determine the viscosity of the molten plastic material within the machine and to provide an output signal proportional thereto, said means comprising means for determining pressure and velocity parameters associated with said molten plastic material; and,
   b. control means responsive to said output signal to effect a variation in said variable means whereby the amount of energy applied to said material is changed to thereby change the viscosity of said material.

2. The invention in accordance with claim 1 wherein the variable means includes a plurality of means for applying energy to the plastic material and wherein said control means selective effects changes in the amount of energy applied by said plurality of means.

3. A control for a plastic injection machine of the type including a screw rotatably and linearly operable with a barrel of the machine and in which plastic material is rendered molten by the application of energy by variable means associated with the machine, said control comprising:
   a. means to determine the viscosity of the molten plastic material within the machine and to provide an output signal proportional thereto; and,
   b. control means responsive to said output signal to effect a variation in said variable means whereby the amount of energy applied to said material is changed to thereby change the viscosity of said material.

4. The invention in accordance with claim 3 wherein said means to determine the viscosity includes means to provide signals proportional to pressure and velocity parameters associated with said molten plastic material.

5. A control for a plastic injection molding machine of the type including a screw rotatably operated and held under pressure in a first mode of operation and moved linearly at a rate to eject molten plastic from the machine in a second mode of operation, and in which the operations of said screw serve to supply energy to plastic material in said machine to serve in rendering the material molten, said control comprising:
a. means to determine the viscosity of the molten plastic material within the machine and to provide an output signal proportional thereto; and,
b. control means responsive to said output signal to selectively effect variations in the rate at which said screw is moved linearly in the second mode of operation and in the pressure under which said screw is held in the first mode of operation.

6. The invention in accordance with claim 5 wherein said means to determine viscosity includes means to provide signals proportional to pressure and velocity parameters associated with the plastic material.

7. The invention in accordance with claim 5 wherein said control means acts to vary said rate during the period of time said screw is moved linearly and acts to vary said pressure under which said screw is held on a machine cycle next following that during which said output signal is provided.

8. The invention in accordance with claim 7 wherein said means to determine viscosity includes means to provide signals proportional to pressure and velocity parameters associated with the plastic material.

9. The invention in accordance with claim 5 wherein said molding machine further includes heating means for supplying heat energy to said plastic material and in which said control means further effects variations in the amount of heat supplied by said heating means.

10. The invention in accordance with claim 9 wherein said control means acts to vary the rate during the period of time said screw is moved linearly and acts to vary the pressure under which said screw is held and the variation in said heating means on a machine cycle next following that during which said output signal is provided.

11. The invention in accordance with claim 10 wherein said means to determine viscosity includes means to provide signals proportional to pressure and velocity parameters associated with the plastic material.

12. The invention in accordance with claim 9 wherein said means to determine viscosity includes means to provide signals proportional to pressure and velocity parameters associated with the plastic material.

13. A controlled plastic injection molding machine comprising:
a. a supply source of plastic material;
b. a barrel having a centrally extending bore in communication with said source;
c. a screw disposed within said bore, said screw adapted for both rotational and linear motion within said bore whereby under the rotational and linear motions of said screw, energy is supplied to said material, said material is rendered molten and is delivered to a mold associated with said machine;
d. first controlled means to effect said rotary screw motion;
e. second controlled means to maintain a pressure on said screw means, in its rotary mode of operation, in opposition to a pressure developed by the molten plastic material;
f. third controlled means to effect said linear motion of said screw at a prescribed rate;
g. means to determine the viscosity of the molten plastic material with said barrel and to generate a viscosity signal proportional thereto; and,
h. means intermediate said means to determine the viscosity and said second and third controlled means to develop first and second control signals in response to said viscosity signal, said second and third controlled means being responsive, respectively, to said first and second control signals to selectively effect variations in said pressure and said rate.

14. The invention in accordance with claim 13 wherein said means to determine viscosity includes means to provide signals proportional to pressure and velocity parameters associated with the plastic material.

15. The invention in accordance with claim 13 wherein said third controlled means effects a variation in said rate in response to said second control signal during the period of time said screw is moved linearly and said second controlled means effects a variation in the pressure under which said screw is maintained on a machine cycle next following the generation of the viscosity signal.

16. The invention in accordance with claim 13 further including:
a. heating means associated with said barrel for supplying heat to the plastic material within said barrel;
b. a fourth controlled means for governing the amount of heat supplied by said heating means; and,
c. means within said means intermediate to develop a third control signal to effect a change in the output of said fourth controlled means to thereby change the amount of heat supplied by said heating means.

17. The invention in accordance with claim 16 wherein said third controlled means effects a variation in said rate in response to said second control signal during the period of time said screw is moved linearly, said second controlled means effects a variation in the pressure under which said screw is maintained in a machine cycle next following the generation of the viscosity signal and said fourth controlled means effects a change in the output of said heating means in response to said third control signal in a machine cycle next following the generation of the viscosity signal.

18. A method of controlling a plastic molding machine comprising the steps:
a. supplying plastic material to said machine;
b. supplying energy to said material to render it molten;
c. determining the viscosity of the molten material by measuring the pressure and velocity of the material; and,
d. varying the amount of energy supplied to said material in response to the determined viscosity.

19. A method of controlling a plastic injection molding machine comprising the steps:
a. supplying plastic material to said machine;
b. supplying energy to said material to render it molten by a pluraliity of energy input means;

c. determining the viscosity of the molten material and providing an output signal in proportion thereto;
d. deriving control signals in response to said output signal; and,
e. selectively applying said control signals to the plurality of energy input means to vary in amount of energy supplied to said material by said means.

20. A method of controlling a plastic injection molding machine comprising the steps:
a. supplying plastic material in solid form to said machine;
b. supplying energy to said material to render it molten by a plurality of energy input means;
c. measuring the pressure of the molten material within the machine to provide a pressure signal;
d. determining a velocity factor with respect to said molten to provide a velocity signal;
e. combining said pressure signal and said velocity signal to generate a viscosity signal;
f. comparing said viscosity signal to a predetermined reference signal to generate a viscosity error signal;
g. deriving control signals from said viscosity error signal; and,
h. selectively applying said control signals to the plurality of energy input means to vary the amount of energy supplied to said material by said means.

* * * * *